Patented Oct. 29, 1946

2,410,205

UNITED STATES PATENT OFFICE 2,410,205

LIGNEOUS RESINOUS COMPOSITION AND METHOD OF PRODUCING

Millard R. Dusenbury, Wilmington, Del., assignor to Hercules Powder Company, Wilmington, Del., a corporation of Delaware No Drawing. Application July 31, 1942, Serial No. 453,041

25 Claims. (Cl. 260—124)

1

This invention relates to a novel resinous composition and a method of preparation. More particularly, it is concerned with an improved method of producing a novel resinous composition from ligneous wood and to the resulting product.

Now, in accordance with this invention, it has been found that a novel resin, useful for a wide variety of purposes, may be produced by heating ligneous wood, which has been substantially completely covered with water, with a material selected from the group consisting of higher fatty acids, which contain a conjugated system of double bonds, and their esters, at an elevated temperature and under superatmospheric pressure until the cellular structure of the wood has disappeared. The resin is recovered as a residue remaining after removal of the water solution. Thus, in accordance with the improved process of this invention, a novel resin may be produced by heating a ligneous wood, water and a material selected from the group consisting of higher fatty acids, which contain a conjugated system of double bonds and their esters, at a temperature within the range of from about 240° C. to about 330° C., under superatmospheric pressure until the cellular structure of the wood has disappeared, the water being present in sufficient amount to substantially completely cover the wood, then recovering a resin as the residue remaining after removal of the water solution.

Now, having indicated in a general way, the nature and purpose of this invention, the following examples are illustrative of the invention and are not to be construed as limiting the same. In the examples the ingredients are given in parts by weight unless otherwise indicated.

Example 1

Sixty-six parts of the fatty acids derived from tung oil were dissolved in enough acetone to completely cover 154 parts of spent pine wood chips from which the turpentine, rosin and oils had been extracted. The acetone was distilled off leaving the impregnated chips. The impregnated chips were placed in an autoclave and covered with 550 parts of distilled water. The autoclave was sealed and heated at a temperature of 260° C.–270° C. for 1 hour. This resulted in a 119 parts yield of a hard resin.

Example 2

One hundred parts of the fatty acids derived from tung oil were dissolved in enough acetone to completely cover 100 parts of spent pine wood chips from which the turpentine, rosin and oils had been extracted. The acetone was distilled off leaving the impregnated chips. The impregnated chips were placed in an autoclave and covered with 550 parts of distilled water. The autoclave was sealed and heated at a temperature of 260° C.–270° C. for 1 hour. This resulted in a 143 parts yield of resin.

Example 3

Sixty-six parts of oiticica oil were dissolved in enough acetone to completely cover 154 parts of spent pine wood chips from which the turpentine, rosin and oils had been extracted. The acetone was distilled off leaving the impregnated chips. The impregnated chips were placed in an autoclave and covered with 550 parts of distilled water. The autoclave was sealed and heated at a temperature of 260° C.–270° C. for 1 hour. This resulted in a 150 parts yield of resin.

Example 4

One hundred parts of oiticica oil were dissolved in enough acetone to completely cover 100 parts of spent pine wood chips from which the turpentine, rosin and oils had been extracted. The acetone was distilled off leaving the impregnated chips. The impregnated chips were placed in an autoclave and covered with 550 parts of distilled water. The autoclave was sealed and heated at a temperature of 260° C.–270° C. for 1 hour. This resulted in a 130 parts yield of resin.

Example 5

One hundred parts of the fatty acids derived from tung oil were dissolved in enough alcohol to completely cover 100 parts of spent pine wood chips from which the turpentine, rosin and oils had been extracted. The alcohol was distilled off leaving the impregnated chips. The impregnated chips were placed in an autoclave and covered with 500 parts of water. The autoclave was sealed and heated at a temperature of 315° C.–320° C. for 30 minutes. A hard, brittle resin was produced.

Example 6

Sixty-six parts of the fatty acids derived from tung oil were dissolved in enough acetone to completely cover 154 parts of spent pine wood chips from which the turpentine, rosin and oils have been extracted. The acetone was evaporated, leaving the impregnated chips. The impregnated chips were placed in an autoclave and covered with 600 parts of water. The autoclave was sealed and heated at a temperature of 245° C.–250° C. for 2 hours. A hard, brittle resin was thereby produced.

In the above examples, oiticica oil and the fatty acids derived from tung oil have been used as the higher unsaturated fatty acids which contain a conjugated system of double bonds and their esters. The process may be accomplished by the use of any other higher unsaturated fatty acid, which contains a conjugated system of double bonds and its ester, such as for example, the fatty acids from oiticica oil and the like. The mixtures of higher unsaturated fatty acids, which contain a conjugated system of double bonds and their esters as they occur in vegetable oils, animal fats and waxes, may also be employed.

While in the examples pine wood has been employed as the ligneous wood, other operable ligneous woods such as maple, birch, basswood, etc., may be used. Also the equivalent of "ligneous wood" and operable in this process, are other ligneous materials such as ligneous cellulosic grasses and straws which are closely related to wood, such as, for example, bagasse fibre, peat moss, and the like. The wood is preferably used in the form of small chips or as sawdust, to facilitate the penetration of the water during the treatment.

Non-resinous ligneous woods are particularly adaptable for use in this process, but ligneous woods which contain up to about 10% by weight of a resin acid may be used. Pine wood from which turpentine, rosin and oils have been steamed and extracted is particularly desirable. The percentage of the unsaturated higher fatty acid containing a conjugated system of double bonds or ester thereof used with the ligneous wood treated in accordance with the process of the invention should be at least 15% and not more than 80% by weight based on the weight of wood, and preferably from about 30% to 75%.

The pressure under which the heating proceeds will fall within the range of from about 400 lbs. to about 1900 lbs. per square inch. It is desirable at higher temperature to vent the apparatus so as to remove some of the volatile gases formed, such as carbon dioxide. Because of this evolution of these volatile gases, the pressure at which the process is carried out is usually higher than the water vapor pressure at the particular temperature.

The heating may be carried out at a temperature of from about 240° C. to about 330° C., and preferably from about 250° C. to about 280° C. The heating time required in this process is from about 2 minutes to about 6 hours. At lower temperatures, the reaction is slower than at higher. A shortening of the reaction time is also made possible by a direct injection of the hot water into a wood-containing chamber. The type of wood used and the temperature of heating are factors which contribute to vary the heating time.

At the end of the reaction period, the pressure is released, and the material is cooled. The resulting resin is separated from the aqueous solution. If desired, the gases, water and organic material may be expelled from the resin by heating to about 175° C.–275° C. The aqueous layer will usually contain small amounts of acetone, acetic acid, methanol, etc., resulting from the decomposition of the wood.

The resulting resinous composition is characterized by freedom from cellular matter remaining from the wood and by a relatively dark color. It is largely soluble in acetone, cellosolve, carbitol; partly soluble in benzene, toluene, xylene, alcohol, ethylene dichloride, etc., and substantially insoluble in gasoline hydrocarbons. It will have a drop melting point generally above 50° C. and may be as high as about 200° C.

This novel resin is useful for a wide variety of purposes. It may be used in molding compositions and plastics, as a dry core binder, in core oils and core oil emulsions, in asphalt emulsions, as a binding material for fiber building board, in dense pressed boards and in bonding insulation boards.

What I claim and desire to protect by Letters Patent is:

1. The method of producing a resinous composition which comprises heating a ligneous wood, water, and a material selected from the group consisting of higher fatty acids, which contain a conjugated system of double bonds and their esters, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

2. The method of producing a resinous composition which comprises heating a ligneous wood, water and a higher fatty acid, which contains a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

3. The method of producing a resinous composition which comprises heating a ligneous wood, water, and an ester of a higher fatty acid, which contains a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

4. The method of producing a resinous composition which comprises heating a ligneous wood, water, and the fatty acids derived from tung oil which contain a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

5. The method of producing a resinous composition which comprises heating a ligneous wood, water, and oiticica oil, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

6. The method of producing a resinous composition which comprises heating a ligneous wood, water, and fatty acids derived from oiticica oil which contain a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

7. The method of producing a resinous composition which comprises heating pine wood from which the turpentine, rosin, and oils have been extracted, water, and a material selected from the group consisting of higher fatty acids, which contain a conjugated system of double bonds and their esters, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

8. The method of producing a resinous composition which comprises heating pine wood from which the turpentine, rosin, and oils have been extracted, water, and a higher fatty acid, which contains a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

9. The method of producing a resinous composition which comprises heating pine wood from which the turpentine, rosin and oils have been extracted, water and an ester of a higher fatty acid, which contains a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

10. The method of producing a resinous composition which comprises heating pine wood from which the turpentine, rosin, and oils have been extracted, water and the fatty acids derived from tung oil which contain a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

11. The method of producing a resinous composition which comprises heating pine wood from which the turpentine, rosin, and oils have been extracted, water, and oiticica oil, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

12. The method of producing a resinous composition which comprises heating pine wood from which the turpentine, rosin, and oils have been extracted, water, and fatty acids derived from oiticica oil which contain a conjugated system of double bonds, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

13. The method of producing a resinous composition which comprises heating a ligneous wood, water, and a material selected from the group consisting of higher fatty acids, which contain a conjugated system of double bonds and their esters, at a temperature within the range of from about 250° C. to about 280° C. under superatmospheric pressure until the cellular structure of the wood has disappeared, the water being present in sufficient amount to substantially completely cover the wood, then recovering a resin as the residue remaining after removal of the water solution.

14. As a new composition of matter, the resin produced by heating a ligneous wood, water, and the fatty acids from tung oil which contain a conjugated system of double bonds at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

15. As a new composition of matter, the resin produced by heating a ligneous wood, water, and oiticica oil at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

16. As a new composition of matter, the resin produced by heating a ligneous wood, water, and fatty acids derived from oiticica oil which contain a conjugated system of double bonds at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

17. As a new composition of matter, the resin produced by heating pine wood from which turpine, rosin, and oils have been extracted, water, and a material selected from the group consisting of higher fatty acids, which contain a conjugated system of double bonds and their esters, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

18. The method of producing a resinous composition which comprises heating a ligneous wood, water, and a higher fatty acid, which contains a conjugated system of double bonds, at a temperature within the range of from about 240° C. to about 330° C. under a pressure of from about 400 pounds to about 1900 pounds per square inch until the cellular structure of the wood has disappeared, the water being present in sufficient amount to substantially completely cover the wood, then recovering a resin as the residue remaining after removal of the water solution.

19. The method of producing a resinous composition which comprises heating ligneous cellulosic material, water, and a material selected from the group consisting of higher fatty acids which contain a conjugated system of double bonds and their esters, at a temperature within the range of from about 240° C. to about 330° C. under superatmospheric pressure until the cellular structure of said ligneous cellulosic material has substantially disappeared, then recovering a resin as the residue remaining after removal of the water solution.

20. The method of producing a resinous composition which comprises heating ligneous cellulosic material, water, and a higher fatty acid which contains a conjugated system of double bonds at a temperature within the range of from about 240° C. to about 330° C. under superatmospheric pressure until the cellular structure of said ligneous cellulosic material has substantially disappeared, then recovering a resin as the residue remaining after the removal of the water solution.

21. The method of producing a resinous composition which comprises heating ligneous cellulosic material, water, and an ester of a higher fatty acid which contains a conjugated system of double bonds at a temperature within the range of from about 240° C. to about 330° C. under superatmospheric pressure until the cellular structure of said ligneous cellulosic material has substantially disappeared, then recovering a resin as the residue remaining after the removal of the water solution.

22. The method of producing a resinous composition which comprises heating a ligneous wood, water, and from 15% to 80% of a material selected from the group consisting of higher fatty acids which contain a conjugated system of double bonds and their esters, at a temperature within the range of from about 240° C. to about 330° C. under superatmospheric pressure until the cellular structure of the wood has substantially disappeared, the water being present in sufficient amount to substantially completely cover the wood, then recovering a resin as the residue remaining after removal of the water solution.

23. The method of producing a resinous composition which comprises heating a ligneous wood, water, and from 30% to 75% of a material selected from the group consisting of higher fatty acids which contain a conjugated system of double bonds and their esters, at a temperature within the range of from about 240° C. to about 330° C. under superatmospheric pressure until the cellular structure of the wood has disappeared, the water being present in sufficient amount to substantially completely cover the wood, then recovering a resin as the residue remaining after removal of the water solution.

24. The method of producing a resinous composition which comprises heating for from about 2 minutes to about 6 hours, ligneous wood, water, and from 15% to 80% of a material selected from the group consisting of higher fatty acids which contain a conjugated system of double bonds and their esters, at a temperature within the range of from about 240° C. to about 330° C. under superatmospheric pressure, the water being present in sufficient amount to substantially completely cover the wood, then recovering a resin as the residue remaining after removal of the water solution.

25. The method of producing a resinous composition which comprises heating a ligneous wood, water, and a material selected from the group consisting of higher fatty acids which contain a conjugated system of double bonds and their esters, at a temperature within the range of from about 240° C. to about 330° C. under superatmospheric pressure until the cellular structure of the wood has substantially disappeared, the water being present in sufficient amount to substantially completely cover the wood, then recovering a resin as the residue remaining after removal of the water solution, and heating said resin to from 175° C. to 270° C. to expel the volatile material.

MILLARD R. DUSENBURY.